July 3, 1962   J. P. LYNCH ETAL   3,042,560
APPARATUS FOR APPLYING GASKETS TO WASHERS
Filed Oct. 20, 1958   10 Sheets-Sheet 1

INVENTORS
John P. Lynch,
Frank W. Osborn and
Edward L. Hessler
BY Paul E. Mullendore
ATTORNEY July 3, 1962 J. P. LYNCH ETAL 3,042,560
APPARATUS FOR APPLYING GASKETS TO WASHERS
Filed Oct. 20, 1958 10 Sheets-Sheet 4

INVENTORS
John P. Lynch,
Frank W. Osborn and
Edward L. Hessler
BY Paul E. Mullendore
ATTORNEY July 3, 1962     J. P. LYNCH ETAL     3,042,560
APPARATUS FOR APPLYING GASKETS TO WASHERS
Filed Oct. 20, 1958     10 Sheets-Sheet 5
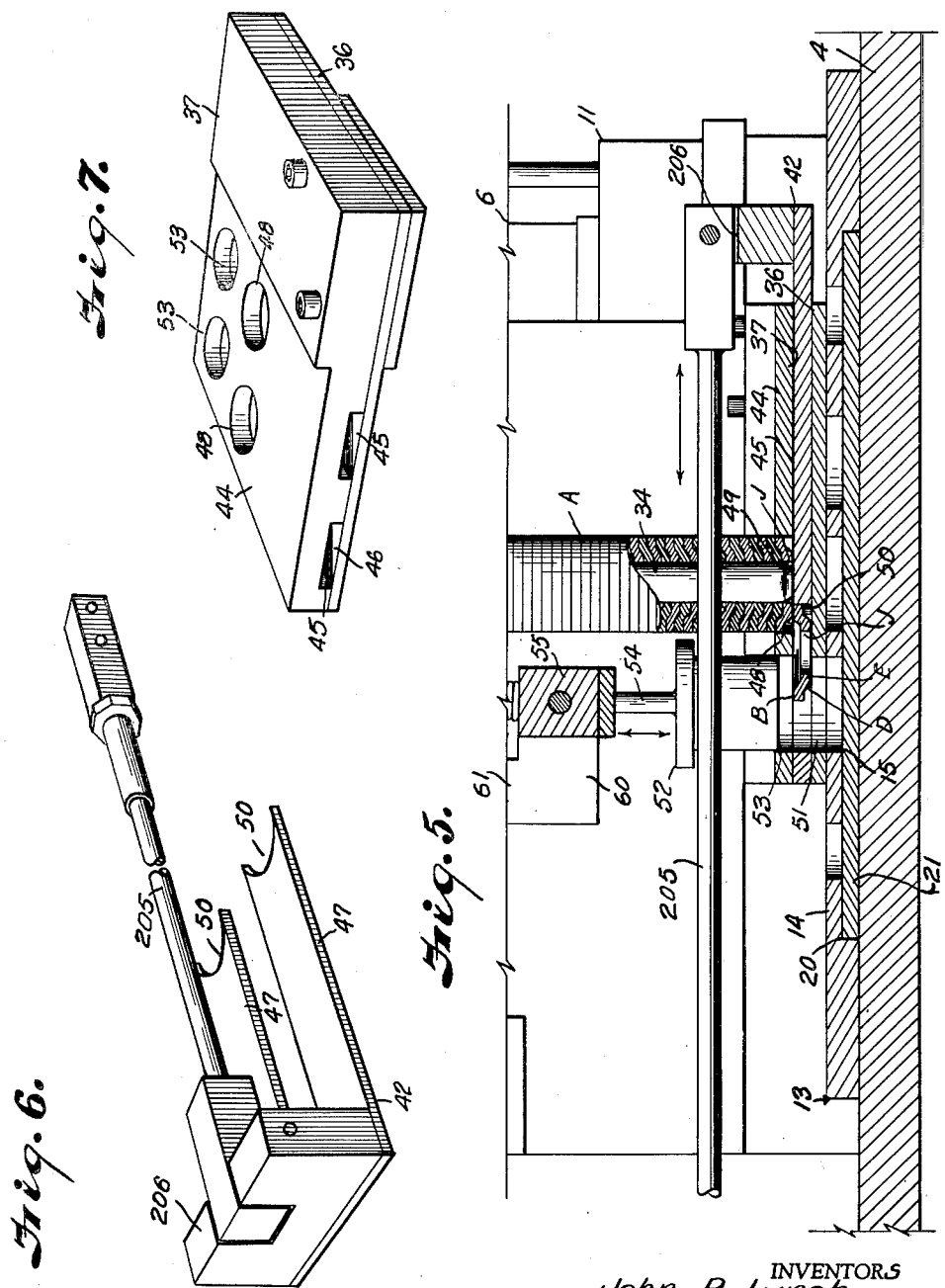
INVENTORS
John P. Lynch
Frank W. Osborn and
Edward L. Hessler
BY Paul E. Mullendore
ATTORNEY

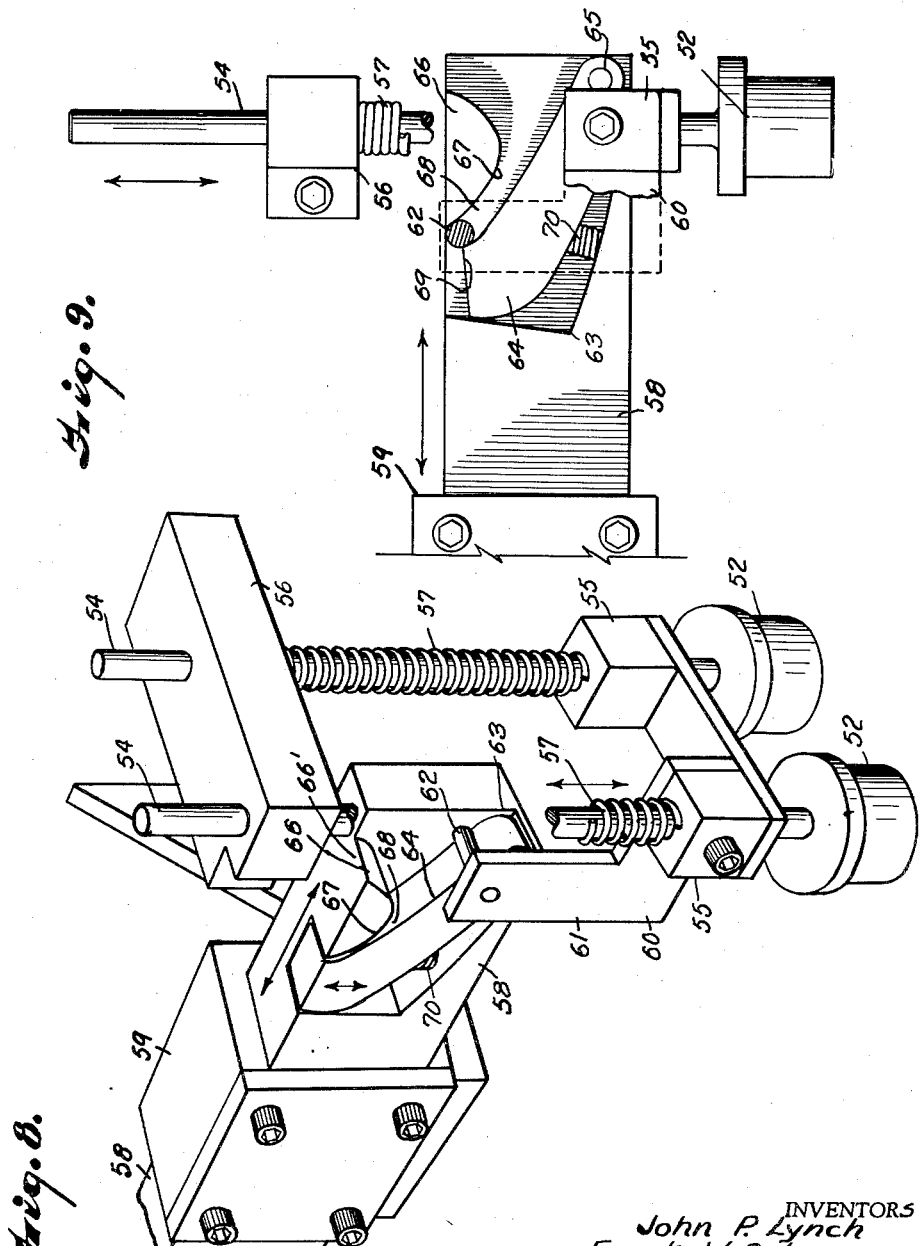

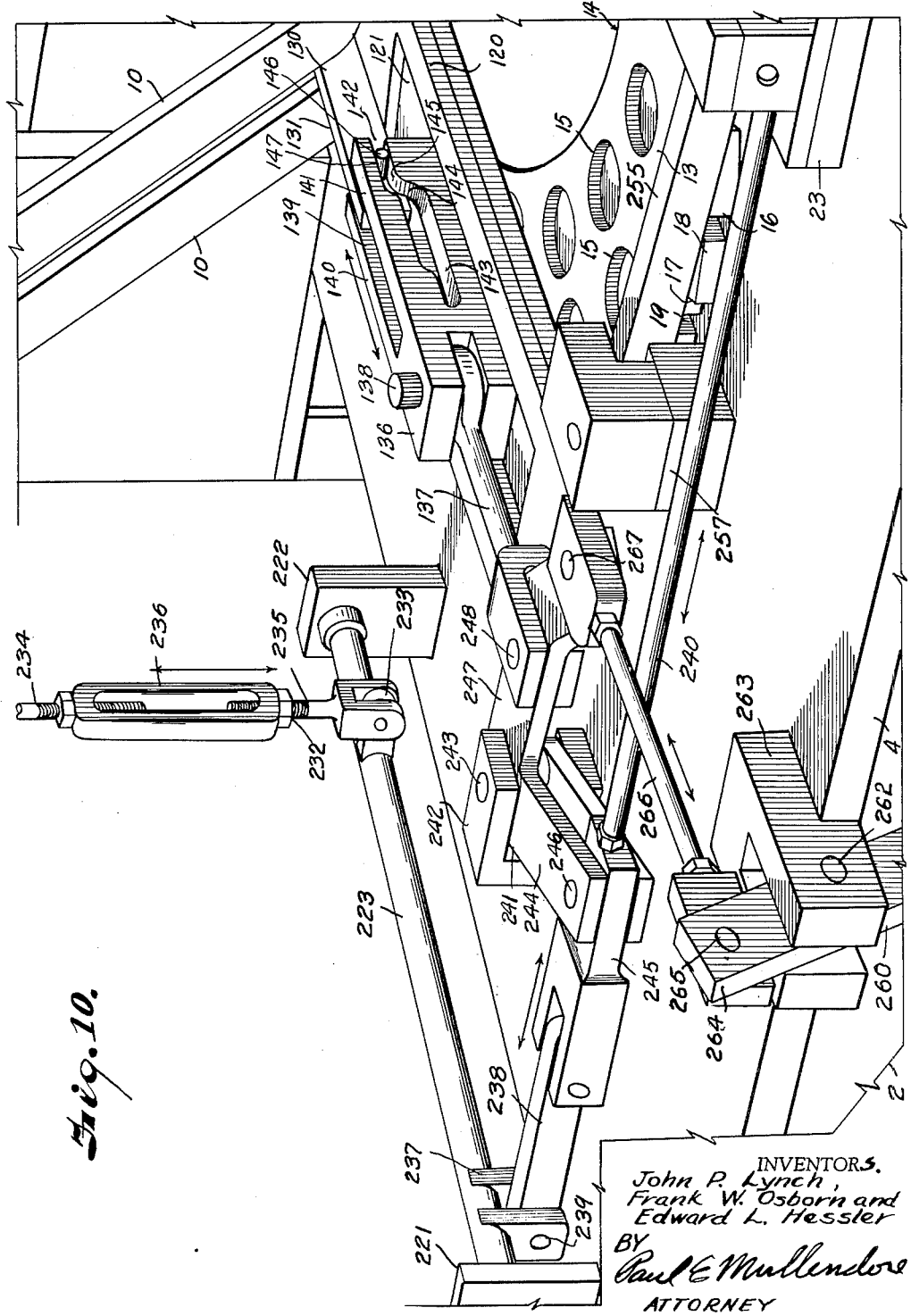

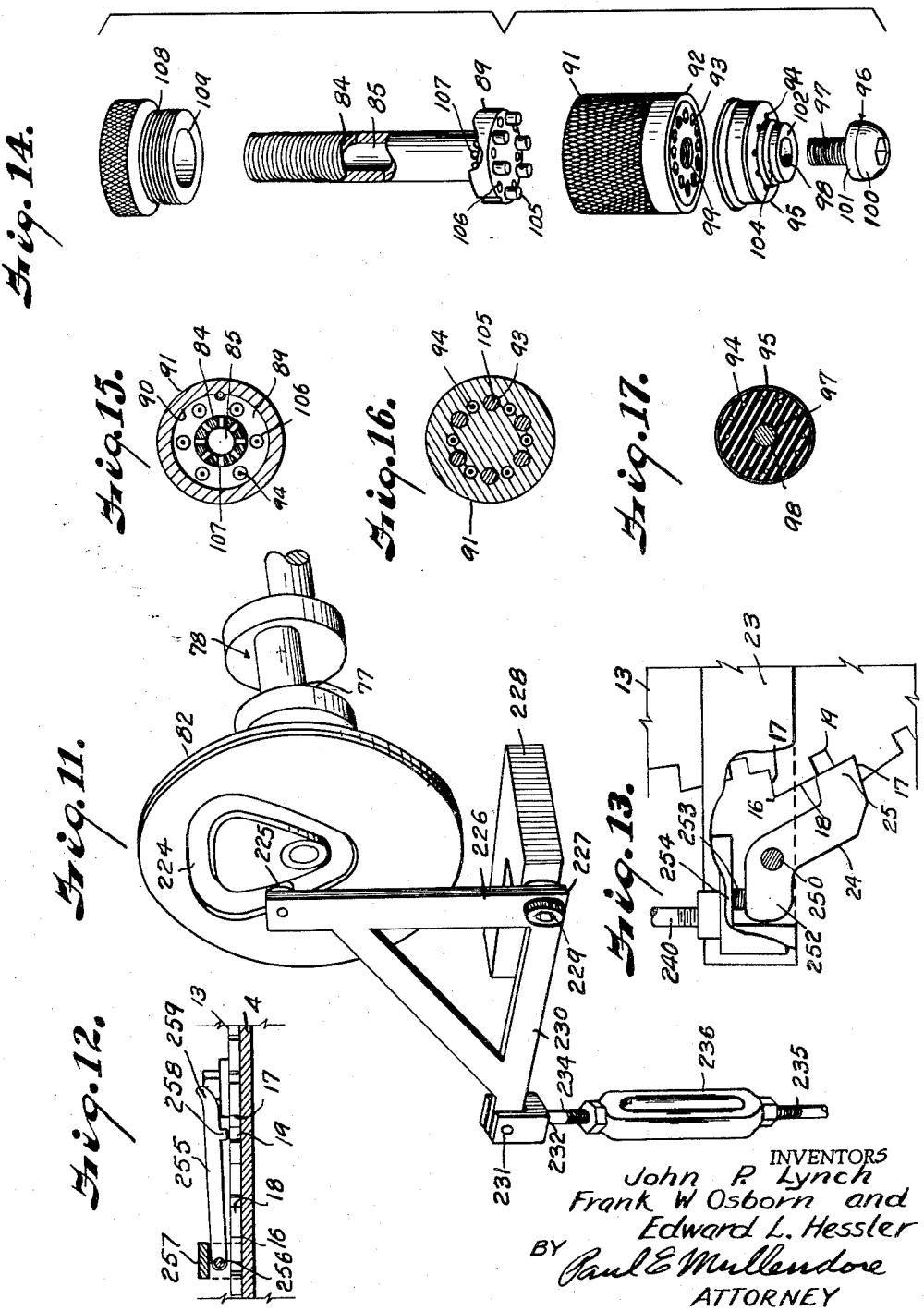

July 3, 1962  J. P. LYNCH ETAL  3,042,560
APPARATUS FOR APPLYING GASKETS TO WASHERS
Filed Oct. 20, 1958  10 Sheets-Sheet 9
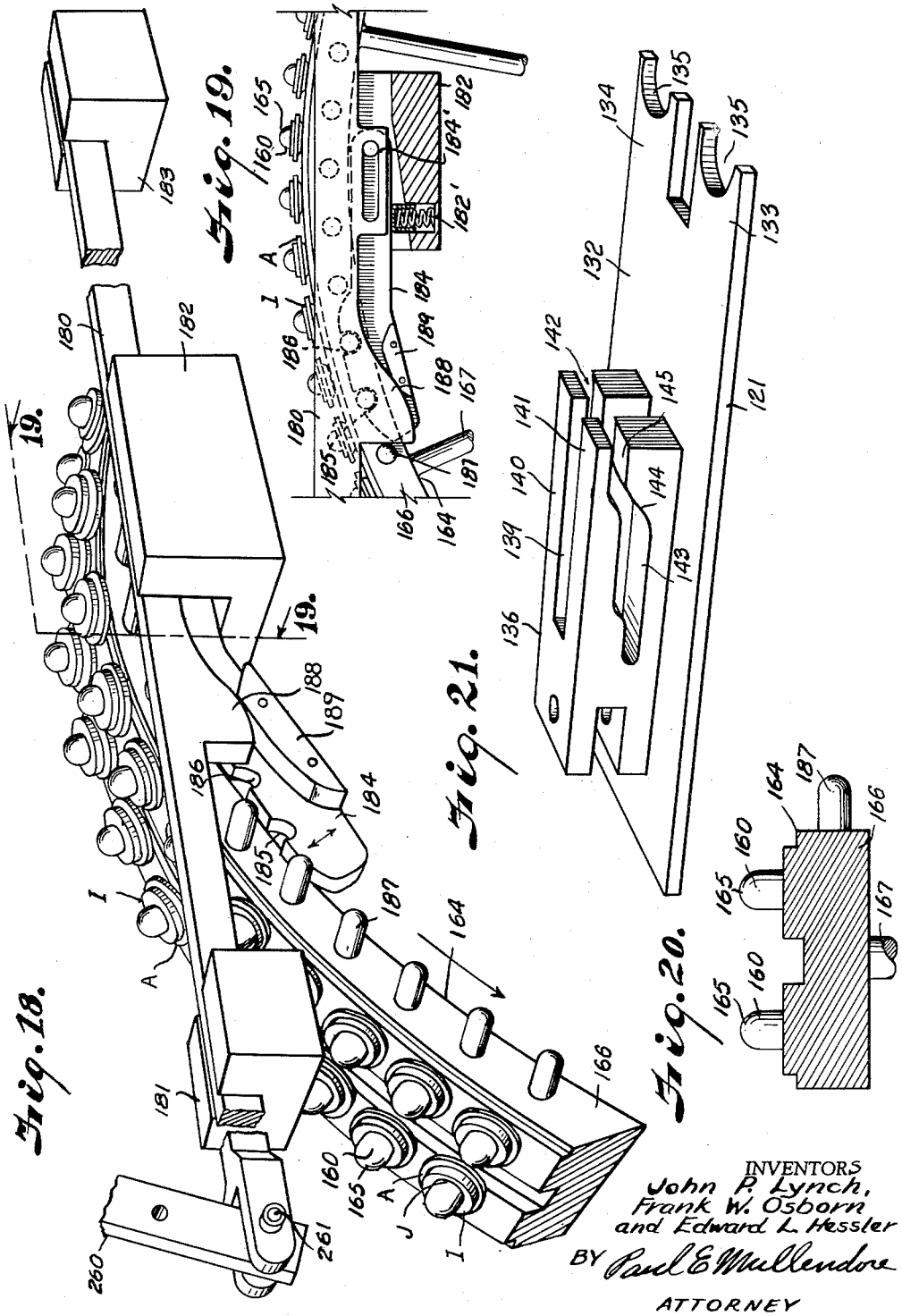
INVENTORS
John P. Lynch,
Frank W. Osborn
and Edward L. Hessler
BY Paul E. Mullendore
ATTORNEY July 3, 1962
J. P. LYNCH ETAL
3,042,560
APPARATUS FOR APPLYING GASKETS TO WASHERS
Filed Oct. 20, 1958
10 Sheets-Sheet 10
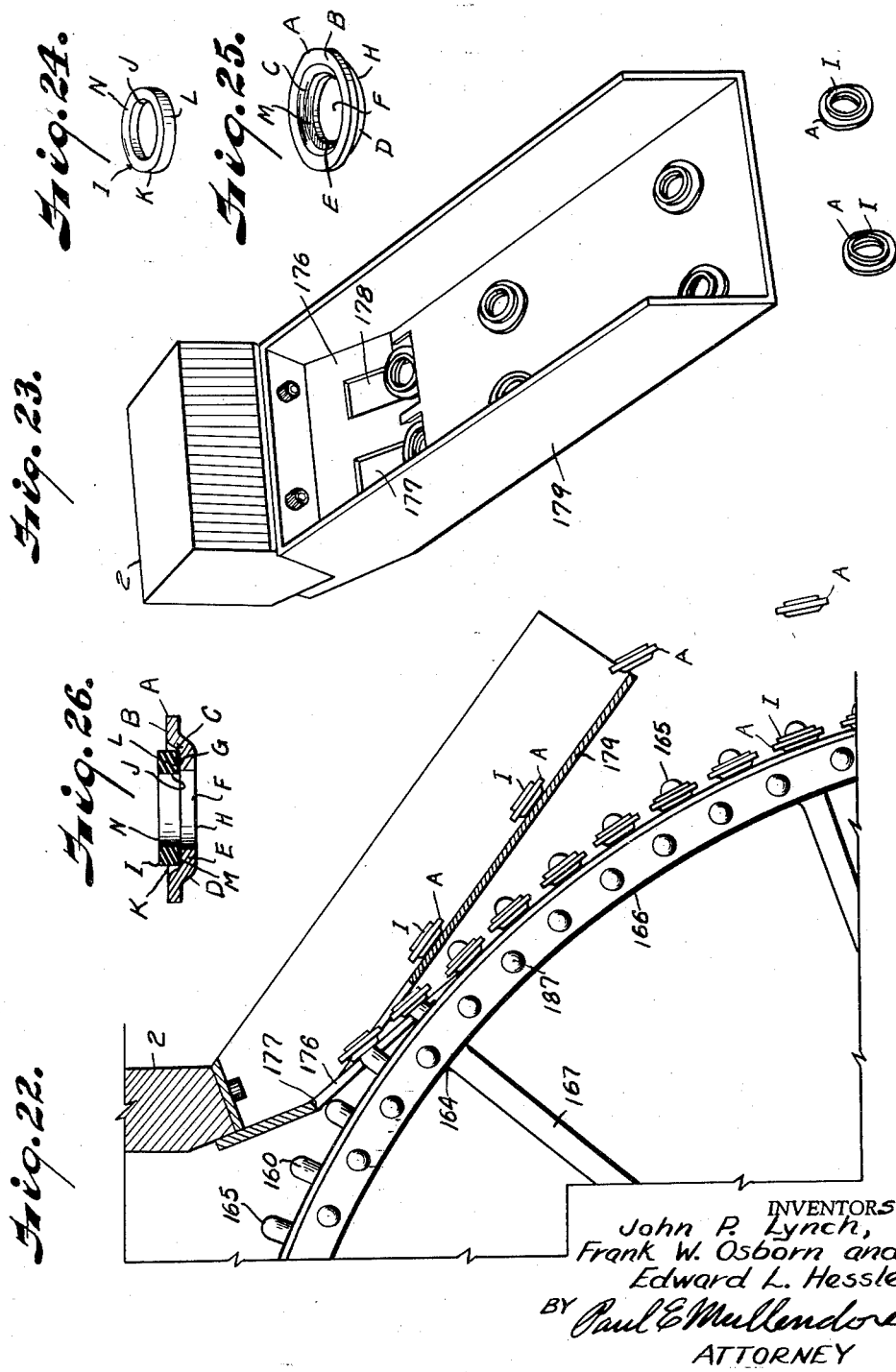

United States Patent Office 3,042,560
Patented July 3, 1962

3,042,560
APPARATUS FOR APPLYING GASKETS TO WASHERS
John P. Lynch, Kansas City, Frank W. Osborn, Independence, and Edward L. Hessler, Kansas City, Mo., assignors to Black Sivalls & Bryson, Inc., Kansas City, Mo., a corporation of Delaware
Filed Oct. 20, 1958, Ser. No. 768,400
26 Claims. (Cl. 156—567)

This invention relates to a machine for applying gaskets to washers of the type used in effecting a fluid-tight seal between fastening devices and the parts connected thereby.

For example, large tanks are composed of sheet metal plates secured together by bolts, and it is necessary to caulk the shanks of the bolts to prevent leakage through the bolt holes in the plates. This is best accomplished by placing gaskets under washers that are used on the bolts, but this requires handling of an extra part that is difficult to apply and keep in place while the bolts are tightened. Placement of the gaskets can be facilitated by attachment thereof to the washers, so that the washers and gaskets may be applied as units. It is obvious that such units are used in vast quantities, and that assembly thereof is difficult, particularly at low cost and with the speed necessary to supply the demand.

Therefore, the principal object of the present invention is to provide a machine for automatically and accurately placing and securely fixing the gaskets to the washers at relatively high speed and in substantially continuous movement.

Other objects of the invention are to provide mechanisms operating in timed relation for automatically feeding washers, applying adhesive in exactly the right amount and tackiness, bringing the gaskets into contact with the adhesive, retaining the gaskets and washers in clamped together relation while they are carried through a drying mechanism to dry the adhesive, and discharging the finished product with the gaskets securely fixed to the washers.

It is also an object of the invention to provide a machine of simple construction and capable of high speed attachment of the gaskets to the washers.

In accomplishing these and other objects of the invention as hereinafter pointed out, we have provided an improved structure as illustrated in the accompanying drawings, wherein:

FIG. 5 is an enlarged section to more clearly illustrate the portion of the mechanism of FIG. 3 that deposits the washers into the pockets of the turntable.

FIG. 6 is a perspective view of the slide for moving the washers into the openings of the turntable.

FIG. 7 is a perspective view of the guide housing for the slide shown in FIG. 6.

FIG. 8 is an enlarged perspective view of the mechanism for operating the plungers that push the washers into the openings of the turntable.

FIG. 9 is a side elevational view of the mechanism shown in FIG. 8.

FIG. 10 is a fragmentary perspective view of the rock shaft and lever mechanisms for applying reciprocatory motion to the slide for moving gaskets into position for application to the washers and for advancing the turntable for carrying the washers to the various operating mechanisms.

FIG. 11 is a perspective view of the cam and the bell crank operated thereby for actuating the rock shaft and lever mechanisms of FIG. 10.

FIG. 12 is a detail of the detent for the turntable.

FIG. 13 is a detail of the pawl and portion of the lever for actuating the turntable.

FIG. 14 is a perspective view of the parts of the adhesive applicator shown in disassembled spaced relation.

FIG. 15 is a cross section through the adhesive applicator on the line 15—15 of FIG. 4, particularly illustrating the adhesive inlet ports to the pressure cylinder and the ports through the piston head.

FIG. 16 is a cross section on the line 16—16 of FIG. 4.

FIG. 17 is a cross section through the lower head of the pressure cylinder on the line 17—17 of FIG. 4.

FIG. 18 is a fragmentary perspective view of the control mechanism for controlling the drying wheel.

FIG. 19 is a section on the line 19—19 of FIG. 18.

FIG. 20 is a section through the rim of the drying wheel, particularly illustrating the units on the pins thereof.

FIG. 21 is an enlarged perspective view of the slide for moving the gaskets into position for application to the washers.

FIG. 22 is a fragmentary side view of the drying wheel and section through the mechanism for removing the assembled units from the drying wheel.

FIG. 23 is a perspective view of the removing mechanism and discharge chute shown in FIG. 20.

FIG. 24 is a perspective view of one of the gaskets.

FIG. 25 is a perspective view of one of the washers.

FIG. 26 is an enlarged section through the assembled unit.

Figure 1:
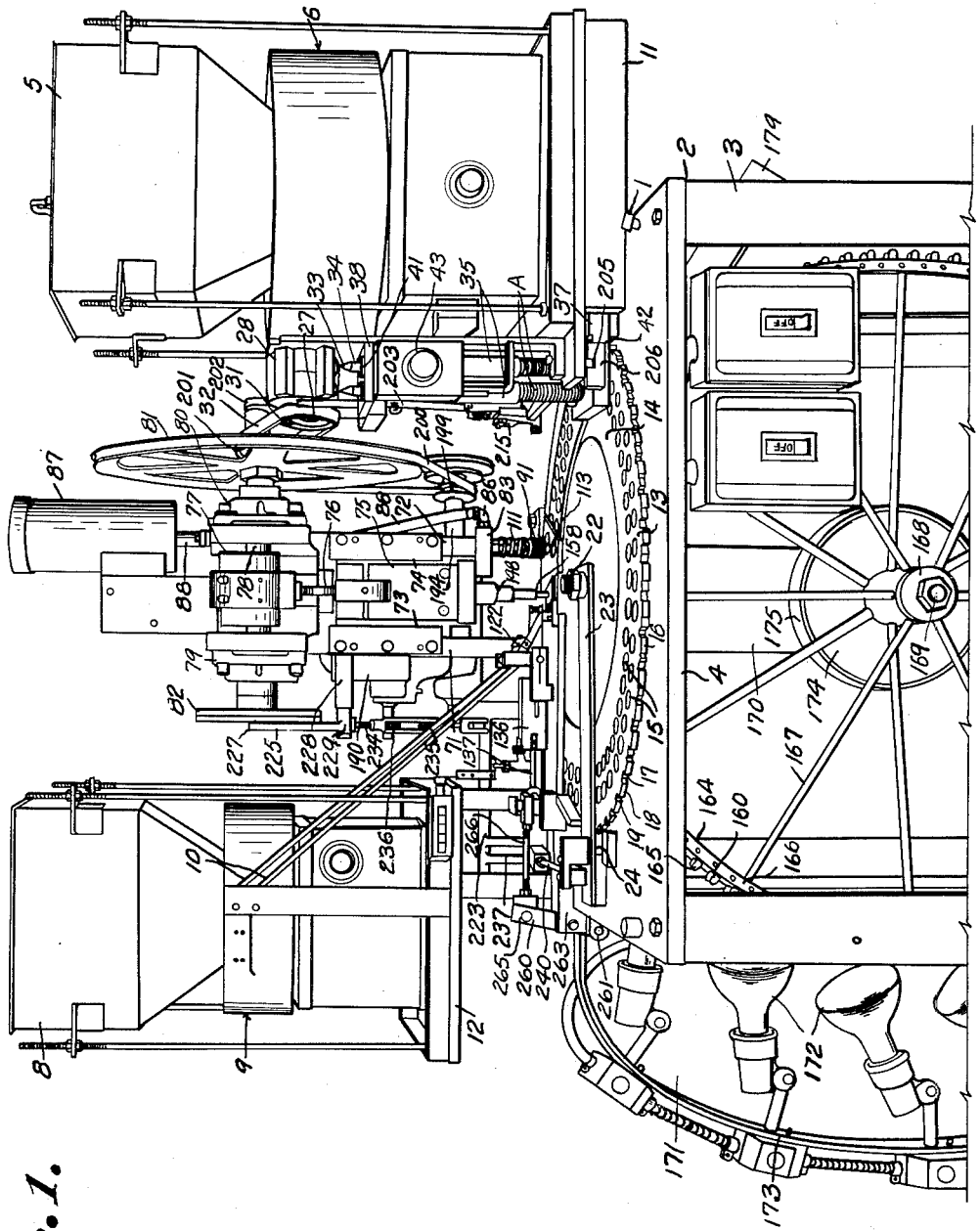
FIG. 1 is a perspective view of a machine for automatically applying and securing gaskets to washers in accordance with the present invention.

Referring more in detail to the drawings:

1 designates a machine for assembling sealing units of a type illustrated in FIGS. 24, 25 and 26. The sealing unit illustrated includes a washer "A" which may be formed of sheet metal or other substantially rigid material, preformed, to provide an annular bearing portion "B" encircling a recess "C" that is formed by an annular portion "D" offsetting an inner annular portion "E." The portion "E" encircles an axial opening "F" of a diameter to pass freely over the shank of a fastening device such as a bolt, and the portions "E" and "B" are of a diameter to provide a gasket seating face "G" and a bearing face "H," respectively, on the respective sides of the recess "C." The gasket "I" comprises a resilient ring having an inner annular face "J" of smaller diameter than the opening "F" and an outer circumferential face "K." The ring is of greater thickness than the depth of the recess "C" and has a side face "L" on one side that is secured to the face "G" of the washer by adhesive "M" and a projecting face "N" on the other side.

The machine 1 includes a frame 2 having legs 3 for supporting a horizontal top 4. The metal washers "A" are contained in a hopper 5 of a feeding mechanism 6 having one or more discharge chutes 7 for delivering the washers in orderly arrangement. The mechanism 6 is best adapted to deliver the washers with the recessed sides facing downwardly.

The gaskets "I" are contained in a hopper 8 of a similar feeding mechanism 9 having discharge chutes 10 corresponding in number with the discharge chutes 7 of the feeding mechanism 6. The feeding unit 6 is supported on a base 11 that is carried at one side of the top 4. The feeding mechanism 9 is supported by a base 12 that is elevated above the top 4 at the opposite rear corner to accommodate various operating mechanisms on the top 4, as later described. The feeding mechanisms 6 and 9 specifically form no part of the present invention, since they may be readily purchased on the present market.

Rotatable on the top 4 is an indexing turntable 13 in the form of a circular disk 14 having an inner and outer circular series of openings 15 to conform with the number of chutes 7 or 10. The openings 15 extend completely through the disk and are of a diameter to completely contain therein the washers "A," when the washers "A" are transferred from the discharge chutes and deposited therein as later described. The periphery of the disk 14 has teeth 16, each having a radial pawl engaging portion 17 and intermediate ramp portions 18 that are each provided with a notch 19. The disk 14 has an annular groove or recess 20 in the under face side thereof in circular registry with the openings 15 to accommodate an annular guide plate or track 21 which is fixed to the top 4 and on which the disk is adapted to be turned about a central axis. Fixed to the table top and extending upwardly through the center of the disk is a pivot or journal 22 mounting the end of a ratchet lever 23. The lever 23 extends radially and outwardly over the top face of the disk and carries, at its outer end, a spring pressed pawl 24 having a tooth 25 for successively engaging the teeth 16 (FIGS. 2 and 13) when the lever 23 is oscillated, as later described, to advance the disk in one direction by steps to carry the washers progressively from the feeding mechanism 6 to the adhesive and gasket applying mechanism to be later described.

In order to invert the washers "A" for subsequent deposit in the openings 15 and to stack the washers in an adequate available supply properly positioned, the chutes 7 discharge over and onto the peripheries of rotary brushes 26 (FIG. 3), the bristles of which catch and control the movement of the washers while they are carried to inverted position. The brushes 26 are rotatably supported on a horizontal shaft 27 that is journaled in a cylindrical housing (FIGS. 2 and 3) carried at the side of the feeding mechanism 6 and above the disk shaped turntable 13. The housing 28 has an arcuate wall portion 29 cooperating with the peripheries of the brushes to guide the washers when being carried from the chutes 7 to discharge openings 30 in the wall portion 29 below the under side of the brushes 26. The brushes are rotated through a pulley 31 mounted on a projecting end of the shaft 27 and which pulley is actuated by an endless belt 32, as later described.

Figure 3:
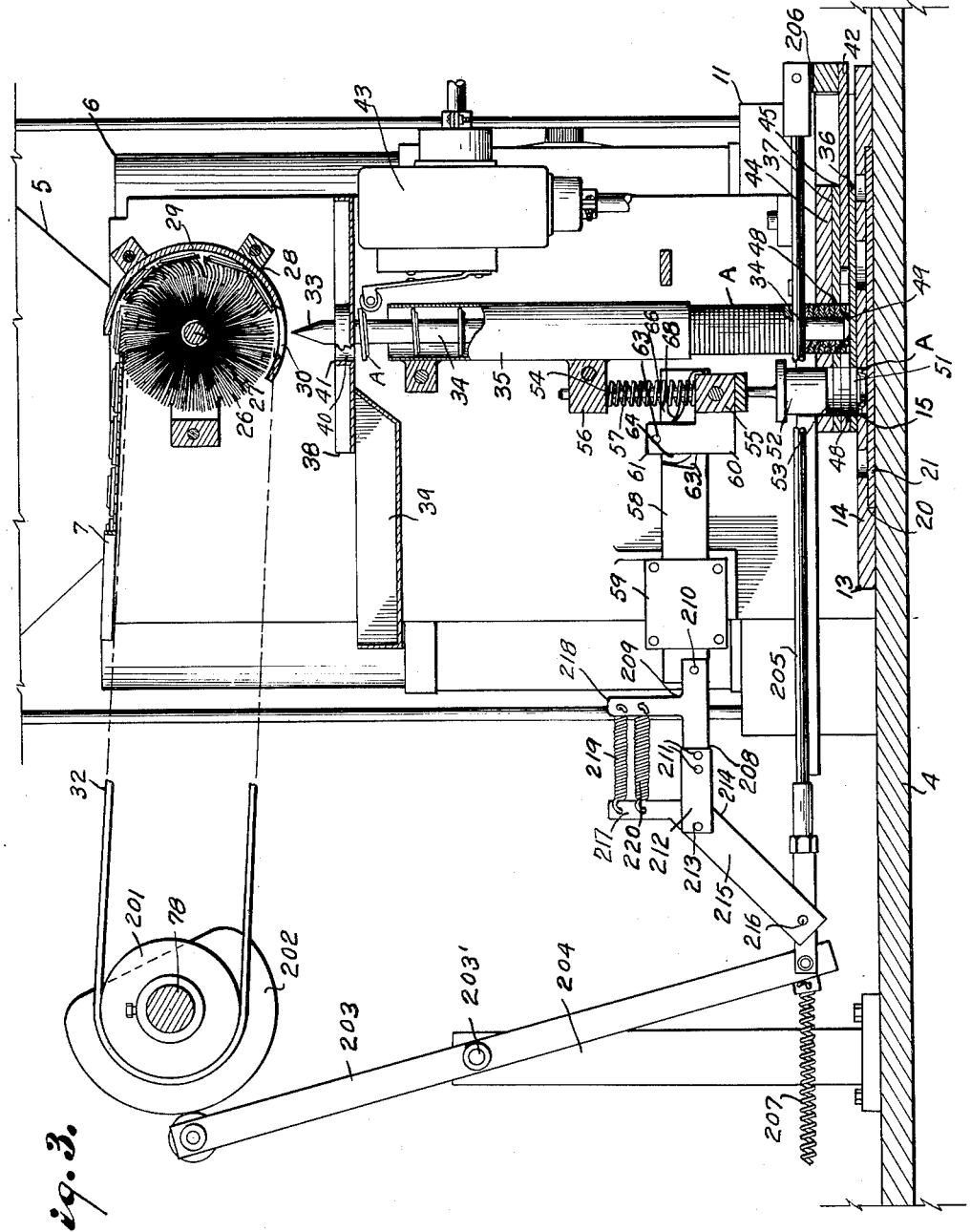
FIG. 3 is a fragmentary view, partially in section, of the mechanism for feeding the washers into an indexing turntable by which they are carried to the mechanisms shown in FIG. 4.

The washers "A" drop through the discharge openings 30 over a tapered end 33 of vertically floating pins 34 which are concentrically retained within guide tubes 35 by the washers "A" that stack upon a plate 36 (FIG. 3) which is superimposed over the turntable and forms the bottom of a housing 37 (FIGS. 1, 3, 5 and 7), later described. Supported over the pins 34 and spaced from the upper end of the guide tubes 35 is a tray 38 (FIGS. 3) for catching many of the washers "A" that miss the tapered end of the pins and which slide from the tray into a collecting pan 39. If the washers drop over the pins 34, they fall through openings 40 in the bottom of the tray. The openings are encircled by flanges 41 to prevent interference of the falling washers by any of the washers caught in the tray 38. The lower ends of the guide pins 34 are loosely supported on the plate 36 and, as above stated, the washers collect in a stack thereon to be fed into the openings 15 in the turntable by a slide 42 (FIGS. 3, 5 and 6). The slide 42 is reciprocable in the housing 37 previously mentioned. The washers "A" accumulate on the pins 34 until the top of the stack approaches the bottom of the tray 38, where the stack makes contact with a switch 43 to stop the feed by the mechanism 6 until the washers have been removed from the bottom of the stack.

The slide 42 and the housing 37 are best illustrated in FIGS. 5, 6 and 7. In addition to the plate 36, the housing includes an upper plate 44 having parallel grooves 45 in the bottom face thereof to cooperate with the upper face of the plate 36 in providing enclosed guideways 46 in which tongues 47 on the slide 42 are movably mounted. The plate has openings 48 registering with the guide tubes 35 and through which the lowermost washers in the stacks drop onto the plate 36 when the slide is moved retractively from under the floating pins 34. As the slide 42 moves from under the pins 34, the pins 34 drop with the washers "A" so that lower slightly rounded ends 49 of the pins 34 keep their position within the openings of the lowermost washers. The tongues 47 have the ends thereof provided with arcuate notches 50 that conform with the curvature of the outer circumference of the washers "A," whereby when the slide 42 is moved in the opposite direction, the washers engaged thereby are moved to the rear ends of the guideways 46 to drop through openings 51 (FIG. 5) in the plate 36 and into the openings 15 of the turntable 13 that are then registering therewith. During this movement, the lowermost washer "A" in each stack is readily disengaged from the floating pins, since the slightly rounded ends 49 of the pins cam the floating pins upwardly until they are supported on the tongues 47 of the slide. During this movement of the lowermost washers "A," the offset portion of the next upper washer in each stack is similarly raised above the tongues 47 of the slide 42 so that the stacks are supported on the slide.

To facilitate discharge of the washers "A" through the openings 51 into the registering openings 15 of the turntable 13, the machine is provided with plungers 52 (FIG. 5) that reciprocate through openings 53 in the upper plate 44. The plungers 52 have stems 54 that carry heads 55. The stems 54 extend upwardly from the heads 55 and are guidedly supported in a lug 56 that projects from sides of the guide tubes 35, as best shown in FIG. 3. Sleeved over the upper ends of the stems 54 and having one end engaging the lug 56 and the other ends engaging the heads 55 are springs 57 to move the plungers 52 downwardly for seating the washers "A" within the openings 15. The plungers 52 may be interconnected and raised in unison against action of the springs by trip connection with a reciprocatory arm 58, the arm 58 being slidable in a guide 59. The connection between the reciprocatory arm 58 and the plungers 52 is best illustrated in FIGS. 3, 8 and 9.

Fixed to one of the heads 55 is an L-shaped bracket 60 having an upwardly extending arm 61 carrying a lateral pin 62 that projects into a recess 63 in the end of the arm 58 to engage a cam track member 64. The track member 64 is pivotally mounted in the recess of the arm by a pin 65 and is movable to and from a fixed cam 66 on the end of the arm 58. The cam 66 has an under cam face 67 cooperating with the inclined cam face on the pivoted track member 64 to provide a pass 68 therebetween as the pin 65 is raised responsive to movement of the reciprocatory arm 58 in one direction for lifting the plungers 52. During final movement of the arm 58, the pin 65 passes above a shoulder 69 at the free end of the member 64, whereupon a spring 70 shifts the cam track member upwardly against the fixed cam 66 to trip the pin 62 thereabove, so that when the arm 58 moves in the opposite direction, the pin 62 moves along an upper surface 70 of the fixed cam as the arm 58 moves in support thereof (FIGS. 8 and 9). During movement of the arm 58, the pin 62 holds the plungers 52 in retracted position against the action of the springs 57, but when the pin 62 reaches the end of the surface 66', it drops from the fixed cam 66 under action of the springs 57 to move the plungers into position for pushing washers into the registering openings in the turntable. Step by step movement of the turntable carries the washers "A," thus deposited, with the recesses thereof in uppermost position, to the adhesive applicators, and from the adhesive applicators to the plungers for applying the gaskets to the washers, as now to be described.

Figure 4:
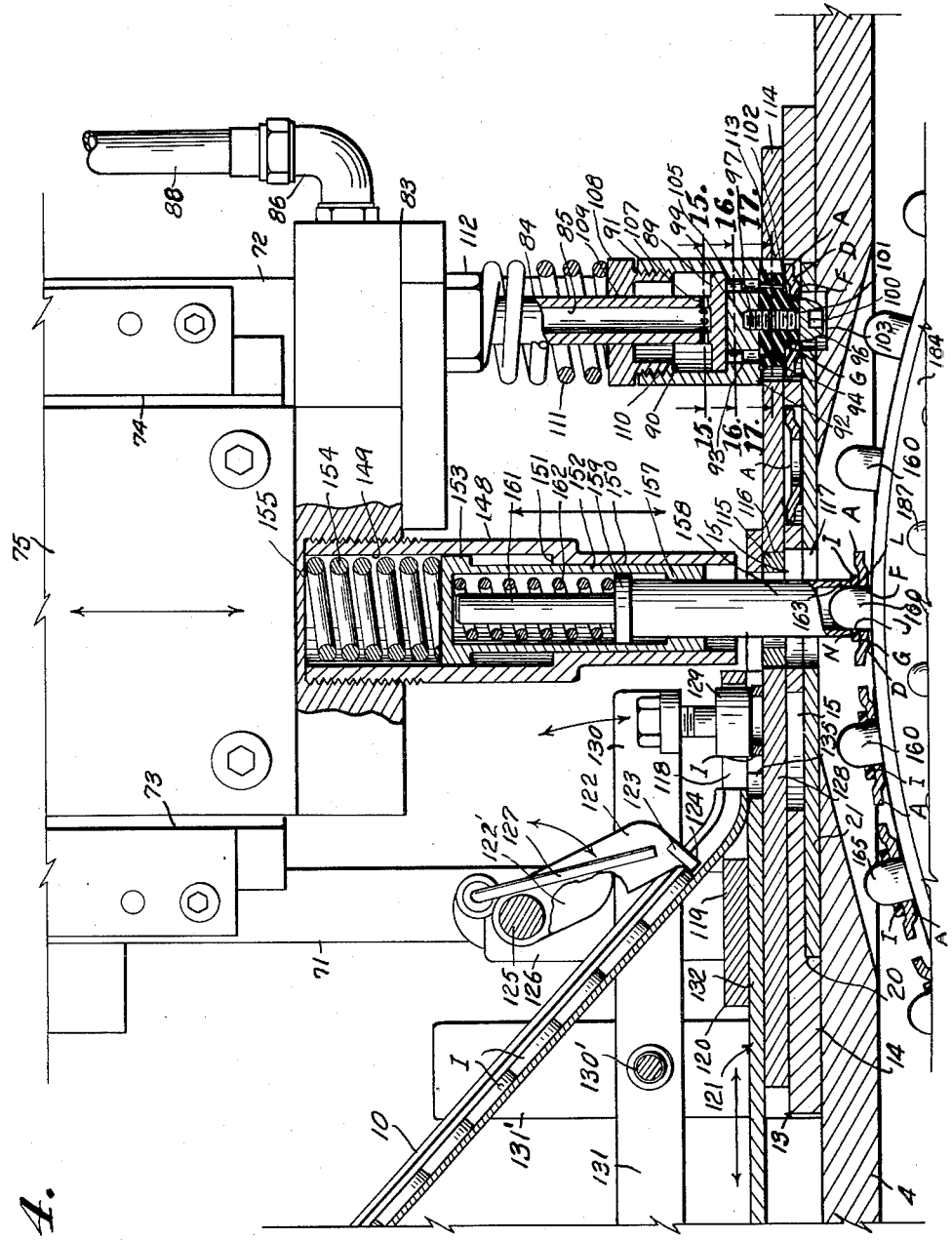
FIG. 4 is an enlarged fragmentary section through the mechanisms for applying adhesive to the washers, bringing the gaskets and washers together, and applying the assembled units to mandrels of a conveying mechanism on which the assembled units are subsequently conveyed through a drying zone.

Extending upwardly from the table at the rear side thereof are spaced apart standards 71 and 72 (FIGS. 1 and 2) having their facing sides provided with tracks 73 and 74 for guidingly supporting a crosshead 75. The crosshead 75 is connected by a pitman 76 with a crank 77 forming a part of a shaft 78. The shaft 78 has opposite ends thereof journaled in bearings 79 and 80 carried at the upper ends of the standards 71 and 72. One end of the shaft 78 carries a drive pulley 81 and the other end of the shaft carries a cam 82 (FIG. 11), later to be described. Fixed to the lower end of the crosshead is an arm 83 carrying depending tubular shanks 84 (FIGS. 1 and 4). The tubular shanks 84 provide vertical channels 85 that connect with a duct 86.

The duct 86 is connected with an adhesive supply tank 87 (FIGS. 1 and 2) by a tube 88. The lower end of each tubular shank 84 carries a piston head 89 that moves within a chamber 90 of a cylinder 91. The cylinder 91 is best illustrated in FIGS. 4 and 14, and has a lower end 92 provided with a circular series of spaced apart openings 93 registering with ports 94 of smaller diameter that are provided in a nozzle 95 covering the lower ends of the ports 93. The nozzle 95 comprises a circular body portion having a flat upper face which is secured to the lower end 92 of the cylinder by a fastening device 96. The fastening device 96 has a threaded shank 97 that extends through an axial opening 98 in the nozzle and into a threaded socket 99 in the end of the cylinder 91. The fastening device 96 for each nozzle 95 has a head 100 which is provided with a shoulder 101 for engaging an axial boss 102 on the nozzle. The heads 100 of each of the fastening devices is generally conical to pass freely through the openings "F" of the washers "A" to provide pilots on the nozzles to assure centering of the washers with respect to the ports 94. The ports 94 encircle the bosses on the nozzles and are in a position to discharge adhesive onto the faces "G" of the washers, as later to be described. In order to accommodate the heads 100 in the lowest position, the circular track and underportion of the table are formed to provide recesses 103, as best shown in FIG. 4.

A seal is provided between each of the nozzles 95 and the portions "E" of the washers "A" immediately encircling the openings "F" by an annular shoulder 104, as best shown in FIG. 14. The piston head 89 of each pressure unit carries a circular series of secondary pistons 105 which are carried into openings 93 for forcing adhesive under pressure through the small ports 94 and onto the faces "G" of the washers "A" when the nozzles are seated against the washers. In order to permit escape of surplus adhesive between the under face of the piston head 89 and the end of the cylinder 91, each piston head 89 is provided intermediate the secondary pistons 105 with ports 106 (FIG. 14) through which the surplus adhesive which is not required to fill the openings 98 is returned to the portion of the piston chamber on the upper side of the piston head 89, the adhesive having been admitted into the cylinder 91 from the channels 85 in the tubular shanks 84 through radial ports 107 (FIGS. 4, 14 and 15).

The upper end of each cylinder 91 is internally threaded and colsed by a plug 108 having an axial opening 109 therein to accommodate the tubular shank 84. Each cylinder 91 is normally retained in its projected position on its shank 84 and with the upper peripheral face of the piston head 89 engaging a stop shoulder 110 on the plug 108 by a coil spring 111 that is sleeved over the shank 84 and has its upper end abutting against a a lock nut 112 that prevents rotation of the tubular shank 84 and its other end bearing against the plug 108, as best shown in FIG. 4.

It is thus obvious that adhesive is discharged into each cylinder chamber 90 above the piston head 89 therein by way of the ports 107 and that the adhesive flows through the ports 106 of the piston head 89 into the lower end of the cylinder chamber 90 to fill the openings 93. The viscosity is such that the adhesive will not flow under its own head through the small ports 94 of the nozzles. On downward movement of the crosshead 75, the shoulder 104 on each nozzle is first brought into contact with a washer "A" to cooperate with the outer periphery of the nozzle 95 in forming a seal with the washer and thereby close the open side of the recesses "C" thereof. On further downward movement of the crosshead, the piston heads are moved downwardly within the piston chambers, so that the small secondary pistons 105 begin to close the openings 93 and apply sufficient pressure on the adhesive trapped therein to force measured quantities of adhesive through the ports 94 and onto the annular face "G" of the washer "A." Attention is directed to the registry of each intermediate one of the openings 93 with the openings or ports 106 in the piston heads to provide low pressure connections with the recesses "C" of the washers to assure entry of the adhesive into the recesses of the washers in the required amounts, and any excess adhesive will escape back to the cylinders 91 through the small ports that are intermediate the ones which are connected with the openings 93 containing the small pistons 105. During entry of the secondary pistons 105 in the openings 93, any adhesive trapped between the piston heads 89 and the lower ends of the cylinders is displaced through the openings in the piston heads to the upper portion of the cylinder chamber. On upward movement of the crosshead 75, the piston heads 89 are first returned to stopped engagement with the shoulders 110, causing a new charge of adhesive to flow through the openings 106 in the piston heads 89 and into the openings 93 of the lower ends of the cylinders. On further upward movement, the cylinders 91 are lifted to remove the nozzles 95 from the openings 113 in a covering plate 114 (FIG. 4) for that portion of the turntable, whereupon the next two or three moves of the turntable carries the washers "A" with the adhesive thereon to a position where they are engaged by magnets 115 fixed within openings 116 of the cover plate 114, and which register with discharge openings 117 in the track (FIG. 4). The magnets 115 thus hold the washers "A" in the openings 15 of the turntable and prevent them dropping through the discharge openings 117 until they are forced therefrom as later described.

The chutes 10 (FIGS. 1, 2 and 4) extend downwardly and terminate, respectively, over the inner and outer series of openings 15 in the turntable. The discharge ends of the chutes 10 are curved into an elongated slot 118 in the top plate 119 of a housing 120 (FIGS. 4 and 10) in which a slide 121 is reciprocably mounted under the discharge ends of the chutes 10. The gaskets "I" slide slowly down the chutes 10 by gravity and are released one at a time by an oscillatory lever 122 (FIG. 4) carrying laterally extending lugs 123 that extend into the chutes 10 in one position of the lever to provide gates 124 for holding back the gaskets "I" in the chutes. The lever 122 is pivotally mounted on a pin 125 that is carried by a bracket 126 carried upon the plate 119. Also carried by the bracket 126 are air nozzles 127 (FIG. 4) for discharging blasts of air against the gaskets "I" as they are released by the lugs 124 to discharge gaskets "I" through the slot 118 and onto the forward end of the slide 121 at the time the slide is projected to push a previous gasket into position for attachment to a washer. When the slide 121 is retracted, the gaskets thereon drop over the ends thereof onto a plate 128 which forms the bottom of the housing 120. The washers are flattened by plungers 129 which come into play near the end of the retractive movement of the slide 121 to flatten the gaskets. The plungers 129 are carried on the end of a rock lever 130 having a tail portion 131 that is actuated responsive to movement of the slide 121. The rock lever 130 is pivoted on a pin 130' that is carried by a bracket 131' as shown in FIG. 4.

The slide 121 (FIGS. 4 and 21) includes a plate 132 having spaced apart tongles 133 and 134, each provided with arcuate recesses 135 conforming in curvature with the outer circumference of the gaskets "I." Fixed to the top of the slide 121 near the rear end thereof is a block 136 connected with one end of a link 137 by a pin 138 (FIG. 10). The block 136 has a slot 139 opening through the forward end thereof to accommodate the tail portion 131 of the rock lever 130 therein. The slot 139 forms the block 136 into forwardly extending arms 140 and 141 having cam slots 142 arranged transversely with respect to the slot 139. The cam slots 142 have low portions 143 extending from near the pin 138 toward the forward ends of the arms 140 and 141 where they slope upwardly as at 144 to terminate in higher horizontal portions 145 opening through the ends of the arms 140 and 141. The tail portion 131 of the rock lever 130 has a transverse pin 146 (FIG. 10) with projecting ends 147 engaging in the cam slots 142 so that as the slide 121 is moved forwardly to project the discharged gaskets "I" over the magnets 115, the tail portion 131 of the lever 130 is moved downwardly by the pin 146 passing into the low portion of the slots to rock forward end of the lever upwardly for lifting and holding the plungers out of the slot 118. This movement of the rock lever 130 also actuates the lever 122 for effecting release of the next gaskets "I" and discharge thereof onto the slide 121 responsive to the blasts of air discharged from the nozzles 127. As the slide 121 moves retractively, ends of the pin 146 again pass into the high portions of the cam slots 142 to rock the lever 130 in the opposite direction to move the plungers 129 into pressing engagement with the gaskets "I" as they drop off the tongues 133 and 134 of the slide. On return of the slide, the tongues 133 and 134 push the gaskets "I" over the magnets 115. The slide thus centers the gaskets "I" with respect to the washers "A" then attached to the magnets 115. The gaskets "I" are brought into contact with the adhesive on the washers "A" by means of the plunger mechanisms previously referred to.

The plunger mechanisms (FIG. 4) are carried by the crosshead 75 previously described, and each plunger mechanism includes a tubular guide 148 located coaxially of the openings 116. Each guide 148 has a bore 149 in the upper end of larger diameter than a bore 150 in the lower end to provide an internal annular shoulder 151. Slidable in the lower bore 150 of each guide 148 is a sleeve 152 having a head 153 slidable in the upper bore 149 and which is adapted to seat on the shoulder 151 under action of a coil spring 154 having one end bearing against the head 153 and the other end bearing against the bottom of a recess 155 of the plate in which each plunger guide 148 is threaded, as best shown in FIG. 4. The head end of the sleeve 152 is closed, but the lower end is provided with an inwardly extending flange 157 for encircling a tubular plunger 158 which is slidable in the sleeve 152. The tubular plunger 158 has a head portion 159 which is adapted to seat on the flange 157 when the crosshead 75 is in retracted position. Extending upwardly from the head 159 is a stem 161 to provide a stop for the head 153 of the outer sleeve 152. The head 159 of the tubular plunger 158 is yieldingly retained against the flange 157 by a coil spring 162 encircling the stem 161 and having one end bearing against the head 159 and the other against the closed end of the sleeve 152.

With the crosshead 75 in its upper position, the open end 163 of the plunger 158 for each plunger mechanism is spaced upwardly from the magnets 115 an ample distance for the gaskets "I" to be discharged therebetween, because the head 159 of the plunger seats against the flange 157 and the head 153 of the sleeve 152 seats against the internal shoulder 151. When the crosshead 75 is moved downwardly, the open ends of the plungers 158 engage the gaskets "I" and push them downwardly through the magnets 115 and into the recesses "C" of the washers "A" that are retained thereby. The gaskets "I" are thus brought into sealing contact with the adhesive. On further downward movement of the crosshead 75, the plungers 158 push the assembled units through the openings 116 and 117 and onto pins 160 (FIGS. 1, 4, 18, 19, 20 and 22).

The pins 160 are carried on the periphery of a drying wheel 164 and have a diameter to pass through the openings "F" of the washers "A." The pins 160, however, are large enough to slightly expand the gaskets "I." To facilitate passage of the gaskets onto the pins, the pins have rounded outer ends 165. The gaskets "I" are thus slightly stretched over the pins 160 and grip the pins to clamp the washers "A" against the peripheral face of the drying wheel 164. It is thus obvious that the washers "A" are retained against the adhesive to assure a satisfactory bond when the adhesive is dried, as later described. Upon lift of the crosshead, the plungers 158 are lifted from the pins 160, leaving the assembled unit on the pins of the drying wheel.

The drying wheel 164 includes a continuous annular rim or band 166 that is carried by spokes 167 from a hub 168 (FIG. 1). The hub 168 is journaled on a spindle 169 carried by a part 170 of the frame of the machine. The wheel is thus rotated on the spindle for carrying the assembled units through a drying zone 171 comprising a plurality of heat lamps 172 that are carried by an arcuate bracket 173 extending around one side of the wheel. The hub of the wheel carries a brake drum 174, and extending around the brake drum is a brake band 175 that is fixed to the part 170 of the frame to control turning of the wheel and for holding the wheel stationary during application of the units to the pins 160.

The units are removed from the pins on the side of the wheel opposite the drying lamps by a lifter plate 176 provided with slots 177 and 178 to pass the pins and which forms ramps that engage under the washers "A" to pry them from the pins 160 during the interval that the wheel is in motion. The units, when released, flip onto the bottom of an inclined chute 179 for discharge from the machine (FIGS. 22 and 23).

The drying wheel 164 is advanced step by step after application of an assembled unit on the pins 160 to carry the units through the zone 171 and to advance pins into position for receiving the next assembled units. Advancement of the wheel also carries the completed units into contact with the lifter plate 176 by which they are stripped from the pins 160 and delivered to the discharge chute 179. The drying wheel is under control of a bar 180 that is reciprocable under the top 4 in guides 181, 182 and 183 to actuate the detent 184 having notches 185 and 186 for engaging pins 187 extending laterally from the rim of the drying wheel, as best shown in FIG. 18. The pins 187 are positioned on the drying wheel in corresponding relation with the spacing of the pins previously described, and the detent is actuated by a cam 188 on the bar which engages a cam lug 189 on the detent 184. The detent 184 has a lost motion connection 184' with the bar 180 to allow for movement of the detent into and out of engagement with the pins 187 responsive to action of the cams 188 and 189. The detent is retained in contact with the slide bar 180 by a spring 182' (FIG. 19).

The various mechanisms of the machine to which the present invention relates are actuated by a common source of power and actuated in timed relation to perform the different operations, as now to be described.

Figure 2:
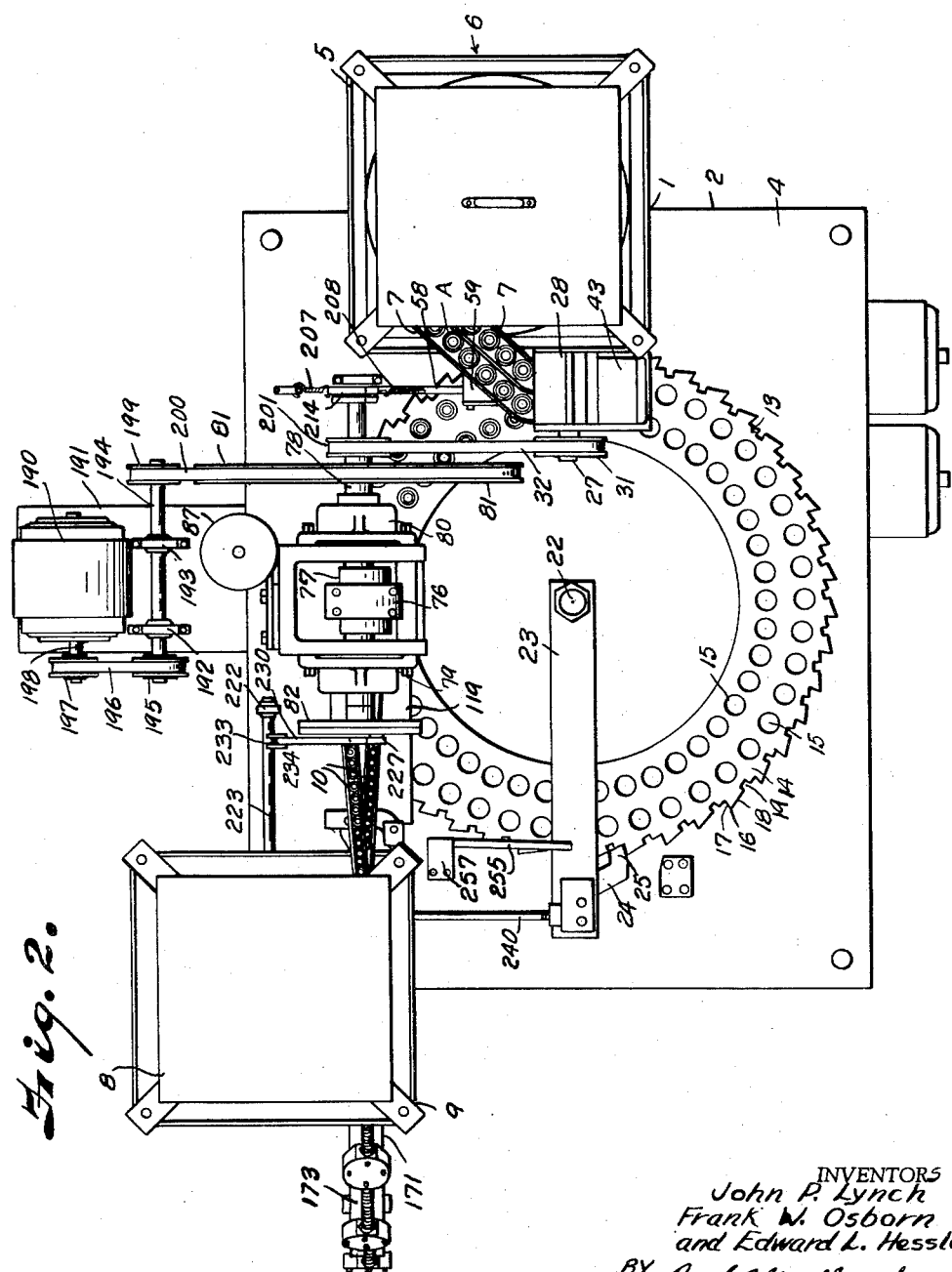
FIG. 2 is a plan view of the machine.

In the illustrated instance, a motor 190 is mounted on a bracket 191 that extends rearwardly from the frame, as shown in FIG. 2. Mounted on the bracket 191 in suitable bearings 192 and 193 is a countershaft 194. The countershaft 194 carries a pulley 195 that is actuated by a belt 196 operating over a drive pulley 197 on the motor shaft 198. A pulley 199 on the opposite end of the countershaft 194 drives the pulley 81 on the crank shaft 78 through a belt 200 operating over the respective pulleys 81 and 199.

Mounted on the crankshaft 78 is a pulley 201 (FIG. 3) for driving the endless belt 32 previously mentioned. Also mounted on the crankshaft is a cam 202 to operate a rock lever 203 which is pivotally mounted on a pin 203' on a bracket 204 that is carried on the top 4 (FIG. 3). The lower end of the rock lever 203 is connected by a link 205 with a lug 206 (FIG. 6) to actuate the slide plate 36 previously referred to, in one direction, and in the opposite direction by a spring 207 (FIG. 3) that is connected with the link and has its opposite end connected with a fixed part of the frame. The arm 58 is reciprocated by a safety link connection 208 with the link 205, as now to be described.

The safety link 208 (FIG. 3) includes a T-shaped part 209 rigidly connected with the arm 58, as indicated at 210. Connected with the T-shaped part 209 by shear pins 211 is a part 212 that is normally held in rigid alignment with the part 209 by the shear pins 211. Pivotally connected with the part 212 by a pin 213 is a bell ally connected with the part 212 by a pin 213 is a bell crank 214 having an arm 215 pivotally connected by a pin 216 with the link 205. The other arm 217 of the bell crank 214 is connected with an upstanding arm 218 of the part 209 by springs 219 and 220. Should, for any reason, the arm 58 or parts connected therewith become jammed, the shear pins 211 will break and free the part 212, whereby the link connection is freed from its driving connection with the arm 58. The springs 219 and 220 are important in holding the separated parts together.

Extending along the rear edge of the top 4 and having ends journaled in brackets 221 and 222 (FIGS. 1, 2 and 10) is a rock shaft 223 which is oscillated by the cam 82, previously referred to. The cam 82 is provided with a track 224 in the outer face thereof for a roller 225 that is carried on an arm 226 of the bell crank lever 227. The lever 227 is supported on a fixed part 228 of the frame by a pin 229 (FIG. 11). The other arm 230 of the bell crank is connected through a pin 231 with the upper end of a link 232 which has its lower end connected with an arm 233 (FIG. 10) on the rock shaft 223. The link 232 includes sections 234 and 235 that are adjustably connected by a turnbuckle 236 for positioning the arm 233 relatively to the cam track. The rock shaft 223 has depending ears 237 that connect with a link 238 by a pin 239. The other end of the link 238 is connected with a link 240 that in turn connects with the ratchet lever 23 previously described.

The slide 121 and bar 180, previously described, are also operated from the link 240 by means of a bell crank 241. The bell crank 241 is mounted in a bracket 242 that is carried on the table top 4 (FIG. 10). The bell crank 241 is pivotally connected with the bracket 242 by a pin 243 to oscillate horizontally above the top 4. One arm 244 of the bell crank connects with a part 245 of the link 240 by a pin 246, so that when the link 240 is reciprocated, the bell crank 241 is rocked about the axis of the pin 243. The other arm 247 of the bell crank is connected with the link 137 previously mentioned by a pin 248.

The lever 23 carries the pawl 24 which is pivotally mounted thereon by a pin 250. The pawl has the tooth 25 that is adapted to engage the faces 17 and 18 on the teeth 16 of the turntable 13, previously described. The pawl 24 has a tail portion 252 that is engaged by one end of a coil spring 253 which seats against a lug 254 on the lever 23, as best shown in FIG. 13. Thus when the lever 23 is oscillated by the link 240, the pawl is moved in a counterclockwise direction to advance the turntable one space, and when the lever 23 is moved in the opposite direction, the tooth 25 of the detent rides over the face 18 of the following tooth 16 to drop behind the face 17 to again advance the turntable 13 on the return movement of the link 240.

In order to hold the turntable in fixed position during retractive movement of the lever 23, and while the various mechanisms are being actuated to apply the adhesive and gaskets to the washers, the lever 23 actuates a latch 255 that is pivotally mounted as at 256 on a bracket 257 carried by the top 4, as best shown in FIGS. 2 and 12. The latch has a tooth 258 that rides upon the turntable as the turntable moves thereunder, and at the end of each movement the tooth drops into a notch 19. The tooth is lifted by the lever 23 when the lever engages under an upwardly curved end 259 of the latch (FIG. 12).

The bar 180 that controls the drying wheel is pivotally connected at its outer end with one end of a rock lever 260 by a pin 261 (FIG. 18). The rock lever is supported on a pin 262 that is carried by a bracket 263 which is fixed to the top 4, as best shown in FIG. 10. The other end 264 of the rock lever 260 is connected by a pin 265 with a link 266, which in turn is connected with the free end of the bell crank arm 247 by a pin 267, as also shown in FIG. 10.

Assuming that the motor 190, heat source comprising the lamps 172, washer feeding mechanism 6, and gasket feeding mechanism 9 are in operation, so that all parts of the machine are in motion as previously described, quantities of washers "A" and gaskets "I" are placed in the hoppers 5 and 8, respectively, and a supply of adhesive is poured into the tank 87. With the mechanism 6 in operation, the washers "A" are fed to the chutes 7 with the recess sides downwardly, since the washers are more easily sorted and arranged in proper relation by the mechanism 6 with the washers in that position. Simultaneously, the mechanism 9 feeds the gasket rings "I" in orderly arrangement for passage through the chutes 10. The washers are passed in upside down position from the chutes 7 onto the upper periphery of the brush 26, where they are carried by the bristles thereof through the pass provided by the arcuate wall portion 29 of the brush housing 28 to an inverted position where they are discharged through the openings 30 and threaded onto the points 33 of the floating pins 34. The washers move downwardly on the pins through the flanged openings 40 of the collection pan 39 and into the guide tubes 35. The washers thus collect in stacks with the lowermost washers resting upon the plate 36 of the slide housing 37 and on which the rounded ends of the pins 34 are adapted to rest, as previously described. When the tops of the stacks reach the switch 43, the switch will function to stop further feed of the washers until washers have been removed from the bottom of the stack. This is an important feature of the invention, because it assures an adequate reserve of properly positioned washers for insertion into the openings 15 of the turntable 13. Should any washers tend to miss the point 33 of the pin 34, they will deflect into the pan 39, from which they may be removed and returned to the hopper 5. The brush 26 is in continuous operation through its driving connection with the crankshaft 78 by means of the belt 32 which operates over the pulleys 201 and 31, as best shown in FIGS. 2 and 3.

The turntable 13 is being rotated in a counterclockwise direction (FIG. 2) by increments to establish dwells during which the adhesive is applied to the washers and the other operations are performed to provide assembled units. The turntable is advanced by the pawl 24 which is carried by the oscillating lever 23. The lever 23 is oscillated through the link 240 that connects with the rock shaft 223, and which in turn is oscillated by the adjustable link 232 that is actuated by the bell crank 227 through the cam 82 on the crankshaft 78. On oscillation of the lever 23, the pawl 24 is carried thereby in the counterclockwise direction, so that the tooth 251 thereof pushes against the face 17 of one of the teeth 16 of the turntable, whereby the turntable is advanced in increments according to the spacing of the circular series of openings 15 in the turntable. On retractive movement of the lever 23, the tooth of the pawl rides along the face 18 of the following tooth, during which time there is a dwell of the turntable and which continues until the tooth of the pawl drops off the face 18 into engagement with the next face 17 under action of the spring 253. On the return stroke of the lever, the wheel is again advanced another step, whereby empty openings 15 are carried into receiving relation with the slide 42.

The slide 42 is reciprocated under the stacks of washers responsive to movement of the link 205 under action of the rock lever 203 and cam 202 (FIG. 3). On retractive movement of the slide 42, the tongues 47 thereof move under the stack, so that the floating pins and washers drop upon the plate 36. Then when the slide 42 moves forwardly, the lowermost washers "A" of the stacks are engaged by the arcuate ends 50 of the tongues and are pushed thereby toward the openings 15 of the turntable that are then registering with the plungers 52. The lowermost washers are readily removed from under the floating pins incidental to the portions "D" thereof engaging under the rounded ends of the pins. At the end of the stroke of the slide 42, the plungers 52 come into action to seat the washers snugly within the openings 15 of the turntable to hold them in a fixed position relatively to the turntable and the subsequent operating mechanisms. The plungers are raised by lifting of the pin 62 on the cam track 64, and the plungers are dropped by the pin 62 riding off the flat surface of the fixed cam 66 under action of the springs 57. Should, for any reason, the parts tend to jam, the shear pins 211 will break and free the members that comprise the connecting link between the bell crank 214 and the arm 58. After deposit of the washers by the plungers 52, the plungers retract along with the side 42 preparatory for insertion of washers into the next following openings 15 upon the next step of the turntable. The action continues until the foremost washers are carried into registry within the adhesive applicators.

The crosshead 75 is actuated from the crank of the crankshaft 78, so that the cylinders and nozzles carried thereby are moved toward the washers. The nozzles are stopped when the shoulders 104 and 95 seat upon inner edges of the offset flanges "B" and "E" (inner and outer annular bearing portions) of the washers. The crosshead 75 continues its descent, compressing the springs 111 to apply pressure for maintaining the shoulders in sealing contact with said portions of the washers, and thereby prevent any escape of adhesive when the pressure is applied on the adhesive in the cylinders 91 as the main pistons 89 come into action.

During a previous upstroke of the crosshead, adhesive has filled the openings 93 under hydrostatic pressure of adhesive in the container 87 acting through the vertical pipe 88, channel 85 of the tubular shanks 84, radial openings 107, and the openings 106 of the main pistons, so that during the final downward stroke of the crosshead 75, the main pistons are carried downwardly within the cylinders, and the secondary pistons 105 displace the adhesive from those openings 93 that are entered thereby to apply pressure necessary for forcing the adhesive through the small orifices 94 of the nozzles that register therewith onto the inner annular portions "E" of the washers substantially uniformly about the periphery thereof. Surplus adhesive is returned to the cylinders by way of the orifices 94 that connect with the openings 93 which are in connection with the openings 106 of the main pistons. In this way, measured quantities of adhesive are applied to the washers. On the upstroke of the crosshead, the main pistons return to their normal position within the cylinders, with the upper peripheries thereof engaging the stop shoulders 110, during which time the springs 111 expand as the cylinders are picked up by the pistons to carry the nozzles away from the washers.

As the washers are advanced into registry with the discharge openings 117 of the top 4, they are attracted by the magnets 115 and become gripped thereby to prevent them from dropping through the discharge openings. During the upward stroke of the crosshead 75, the tubular plungers 158 are lifted to permit movement of gasket rings thereunder by the slide 121. The gasket rings are supplied to the slide from the chutes 10 upon lifting of the lever 122 which carries the gates 124, the lever being operated by the rock lever 130 engaging the cam 122' on the side of the lever 122. Upon lifting of the gates 124, the lowermost gasket rings "I" in the chutes 10 are released to be discharged from the curved ends of the chutes 10 by the blasts of air discharging through the nozzles 127 during the upstroke of the plungers 129 that are carried by the rock lever 130. The gasket rings propelled by the air jets drop onto the plate 128 in registry with the tongues 133 and 134 of the slide 121 when the slide is in retracted position. The plungers 129 then swing downwardly onto the gasket rings "I," as shown in FIG. 4, on rocking movement of the lever 130 in a clockwise direction. This movement of the plungers 129 occurs on final retractive movement of the slide 121 by the pin 146 moving into the high portions 145 of the cam slots 142 of the slide block 136, the slide block being reciprocated as previously described through the link 137 and bell crank 241, which in turn is actuated by its connection with the link 240. The plungers thus flatten the gasket rings and momentarily hold them in position for engagement by the arcuate recesses 135 of the tongues 133 and 134 of the plate 132 which constitutes the slide 121. As the slide moves forwardly, the plungers 129 are raised incidental to reverse rocking movement of the lever 130 responsive to downward movement of the pin 136 in the portions 144 of the cam slots 142 of the slide block 136. As the slide 121 moves forwardly, the tongues 133 and 134 of the plate 132 push the washers into the forward ends of the recesses 135, where they drop into contact with the washers "A" then retained by the magnets 115. The washers are now in position to be engaged by the tubular plungers 158 on descent of the crosshead 75. The open ends 163 of the plungers 158 engage the gasket rings and push the washers from the magnets 115 as the tubular plungers move downwardly. The washers "A" with the gaskets "I" thereon are thus moved through the discharge openings 117 and onto the pins 160 of the drying wheel 164 that are then registering therewith. The openings "F" in the washers "A" are of sufficient size to pass the washers freely over the rounded ends of the pins, but the pins 160 being of slightly larger diameter than the inner diameter of the gaskets "I" causes the gaskets to expand and takes the circular form of the pins 160 responsive to pressure of the plungers 158 on the gasket rings as the plungers follow the gasket rings "I" onto the pins, as shown in FIG. 4. Any differential movement between the crosshead 75 and plungers 158 is compensated for by action of the springs 162 which are compressed when the downward movement of the plungers 158 is stopped by seating of the washers "A" against the periphery of the drying wheel 164. The forced expansion of the gasket rings "I" over the pins 160 of the drying wheel causes the gasket rings to grip the pins after the pressure of the plungers 158 is relieved therefrom upon upward movement of the crosshead.

The drying wheel 164 is advanced in accordance with movement of the turntable 14 by means of the reciprocatory bar 180, which is actuated from the bell crank 241 through the rocker arm 260. During forward movement of the bar, the cam 188 on the bar acts against the cam lug 189 on the detent 184 and moves the detent out of engagement with the pins 187. During this movement of the bar, the detent remains substantially stationary during the lost motion connection of the detent therewith, as shown in FIG. 19, however, as soon as the bar picks up the detent, the detent is moved retractively in position to engage the next two pins 187. On retractive movement of the bar 180, there is a dwell in movement of the detent during the time that the cam 188 is moving from the cam 189, thereby allowing the notches 185 and 186 in the detent to engage the pins 187 of the drying wheel. During final movement of the bar 180, the detent moves the bar in a counterclockwise direction (FIG. 19) to move the following pair of pins 187 into registry with the tubular plungers.

Continued intermittent movement of the drying wheel carries the washers with the gaskets thereon into the heat zone of the lamps 172 to accelerate drying of the adhesive. After passing the drying zone, the assembled units are carried through the stripper 176 by which the assembled units are stripped from the pins 160 and discharged through the chute 179 into a suitable container.

What we claim and desire to secure by Letters Patent is:

1. An apparatus for securing resilient gasket rings to washers to provide unit assemblies, said apparatus including the combination of means for applying an adhesive to the washers, means for carrying the washers in successive order to the adhesive applying means and advancing the washers from the adhesive applying means with the adhesive thereon, means for depositing a resilient gasket ring onto each washer to make contact with the adhesive, conveying means having pins thereon of slightly larger diameter than the inner diameter of the gasket rings, means for actuating the conveying means to carry the pins into and out of registry with the gasket depositing means, means for pressing the washers with the gasket rings onto the pins for stretching the gasket rings over said pins for maintaining pressure contact of the gasket rings against the washers, an adhesive drying means in the zone of said conveying means to dry the adhesive, and means for stripping the assembled units from said pins.

2. An apparatus for securing resilient gasket rings to washers having inner and outer offset flange portions providing a recess to contain the gasket ring, said apparatus including the combination of means for applying an adhesive to the inner flanges of the washers, means for carrying the washers in successive order to the adhesive applying means and advancing the washers from the adhesive applying means with the adhesive thereon, means for flattening the gasket rings, means for depositing the gasket rings after flattening thereof into the recesses of the washers to make contact with the adhesive, conveying means having pins of slightly larger diameter than the inner diameter of the gasket rings, means for actuating the conveying means to carry the pins into and out of registry with the gasket depositing means, means for removing the washers with the gasket rings from said carrying means and pressing the gasket rings onto the pins against the washers for stretching the gasket rings over said pins to maintain pressure contact of the gasket rings against the washers, an adhesive drying means in the zone of said conveying means to dry the adhesive, and means for stripping the washers with the gasket rings sealed thereto from said pins.

3. An apparatus for securing resilient gasket rings to washers to provide assembled units, including a support having a horizontal top provided with a discharge opening, a turntable having a circular series of openings, means for rotatably mounting the turntable on said top for bringing the openings in the turntable consecutively over the discharge opening, means for feeding the washers into the openings of the turntable, means for advancing the turntable by steps, means for applying adhesive to the washers, means for depositing a gasket ring onto each washer to make contact with the adhesive, a drying wheel rotatable under the top of the support and provided with radially extending pins successively registrable with the discharge opening, means for pushing the washers with the gasket rings from said turntable through the discharge opening and onto the pins as they register therewith and pressing the gasket rings against the washers, and means for stripping the assembled units from said pins.

4. An apparatus for securing resilient gasket rings to washers to provide assembled units, including a support having a horizontal top provided with a discharge opening, a turntable having a circular series of openings, means for rotatably mounting the turntable on said top for bringing the openings in the turntable consecutively over the discharge opening, a tube having support over said top, a reciprocating slide under the tube, a pin within the tube and having loose support on the slide and to drop from the slide when the slide is in retracted position, means for feeding the washers onto the pin to maintain a stack of washers within said tube, means for reciprocating the slide to drop the pin with the stack of washers from the slide and to cause the slide to push the lowermost washer into one of said openings of the turntable while reestablishing support of the stack and pin on the slide, means for advancing the turntable by steps, means for applying adhesive to the washers contained in said openings of the turntable, means for depositing a gasket ring onto each washer to make contact with the adhesive, a drying wheel having rotatable support under the top of the support and provided with radially extending pins successively registrable with the discharge opening, means for pushing the washers with the gasket rings from said turntable through the discharge opening and onto the pins as they register therewith for pressing the gasket rings against the washers, and means for stripping the assembled units from said pins.

5. An apparatus for securing resilient gasket rings to washers to provide assembled units, including a support having a horizontal top provided with a discharge opening, a turntable having a circular series of openings, means for rotatably mounting the turntable on said top for bringing the openings in the turntable consecutively over the discharge opening, a tube having support over said top, a reciprocating slide under the tube, a pin within the tube and having loose support on the slide and to drop from the slide when the slide is in retracted position, means for feeding the washers onto the pin to maintain a stack of washers within said tube, means for reciprocating the slide to drop the pin with the stack of washers from the slide and to cause the slide to push the lowermost washer into one of said openings of the turntable while reestablishing support of the stack and pin on the slide, a plunger movable in time with the slide to deposit the washer snugly within said opening of the turntable, means for advancing the turntable by steps, means intermediate the plunger on the discharge opening for applying adhesive to the washers, means for depositing a gasket ring onto each washer to make contact with the adhesive, a drying wheel rotatable under said top and provided with radially extending pins successively registrable with the discharge opening, means for pushing the washers with the gasket rings from said turntable through the discharge opening and onto the pins as they register therewith to maintain pressure contact of the gasket rings against the washers, and means for stripping the assembled units from said pins.

6. An apparatus for securing resilient gasket rings to washers to provide assembled units, including a support having a horizontal top provided with a discharge opening, a turntable having a circular series of openings, means for rotatably mounting the turntable on said top for bringing the openings in the turntable consecutively over the discharge opening, a tube having support over said top, a reciprocating slide under the tube, a pin within the tube and having loose support on the slide and to drop from the slide when the slide is in retracted position, means for feeding the washers onto the pin to maintain a stack of washers in reserve within said tube, means for reciprocating the slide to drop the pin with the stack of washers from the slide and to cause the slide to push the lowermost washer into one of said openings of the turntable while reestablishing support of the stack and pin on the slide, a plunger movable in time with the slide to deposit the washer snugly within said opening of the turntable, means for advancing the turntable by steps, means intermediate the plunger on the discharge opening for applying adhesive to the washers, means for feeding and flattening gasket rings to be applied to said washers, a slide movable over the turntable for pushing gasket rings onto each washer to make contact with the adhesive, a drying wheel having rotatable support under said top and provided with radially extending pins successively registrable with the discharge opening, means for pushing the washers with the gasket rings from said turntable through the discharge opening and onto the pins as they register with said discharge opening to maintain pressure contact of the gasket rings against the washers during drying of the adhesive, and means for stripping the assembled units from said pins.

7. An apparatus for securing resilient gasket rings to washers to provide assembled units, including a support having a horizontal top provided with a discharge opening, a turntable having a circular series of openings, means for rotatably mounting the turntable on said top for bringing the openings in the turntable consecutively over the discharge opening, means for feeding washers into said openings of the turntable, means for advancing the turntable by steps, means for applying adhesive to the washers, a drying wheel having rotatable support under said top and provided with radially extending pins of slightly larger diameter than the inner diameter of the gasket rings, said pins being successively registrable with the discharge opening, means for pushing the washers with the gasket rings from said turntable through the discharge opening and onto the pins as they register therewith to stretch the gasket rings over said pins to maintain said pressure contact of the gasket rings against the washers, and means for stripping the washers with the gasket rings sealed thereto from said pins.

8. In an apparatus of the character described, means for applying adhesive to washers for attaching gasket rings thereto, said means including a cylinder having a closed end provided with a circular series of spaced apart openings, a nozzle on the closed end of the cylinder having a corresponding series of smaller orifices in connection with said openings, concentric annular faces on said nozzle for establishing circular seals with the washer on the respective inner and outer sides of the series of openings, a piston slidable in the cylinder and having a circular series of secondary pistons adapted to enter some of the openings in the closed end of the cylinder and having openings registering with the other of said openings in the closed end of the cylinder, means for admitting an adhesive into the cylinder on the side of the piston opposite the secondary pistons for flow through the openings in the piston and around the secondary pistons for filling the openings in the closed end of the cylinder when the piston is in a retracted position, and means for moving the cylinder to bring said annular portions of the nozzle into contact with the washer and for moving the piston from said retracted position to project the secondary pistons into their related openings in the closed end of the cylinder to force adhesive through said orifices into contact with the washer and to return excess adhesive through the orifices registering with the said other openings for passage through the openings in said piston to the low pressure side of said piston.

9. In an apparatus of the character described, means for applying adhesive to washers for attaching gasket rings thereto, said means including a cylinder having a closed end provided with a circular series of spaced apart openings, a nozzle on the closed end of the cylinder having a corresponding series of smaller orifices in connection with said openings, concentric annular faces on said nozzle for establishing circular seals with the washer on the respective inner and outer sides of the series of openings, a piston slidable in the cylinder and having a circular series of secondary pistons adapted to enter some of the openings in the closed end of the cylinder and having openings registering with the other of said openings in the closed end of the cylinder, a hollow shank for the piston having outlet into the cylinder, means for admitting an adhesive into the cylinder through the hollow shank for flow through the openings in the piston and around the secondary pistons for filling the openings in the closed end of the cylinder, a closure for the other end of the cylinder having an opening for passing the hollow shank for slidably supporting the cylinder over the piston, a crosshead carrying the shank, a spring encircling the shank for retaining the cylinder resiliently in projected position relatively to the piston, and means for actuating the crosshead to bring said annular portions of the nozzle into contact with the washer and for moving the piston in said cylinder to project the secondary pistons into their related openings in the closed end of the cylinder to force adhesive through said orifices into contact with the washer and to return excess adhesive through the orifices that register with the other of said openings for passage through the openings in said piston to the low pressure side of said piston.

10. In an apparatus of the character described, means for applying adhesive to washers of a type having offset inner and outer flanges providing a recess for containing a gasket ring to be secured to the washer by said adhesive, said means including a cylinder having a closed end provided with a circular series of spaced apart openings, a nozzle on the closed end of the cylinder having a corresponding series of smaller orifices in connection with said openings and adapted to register with the inner flange of the washer, concentric annular shoulders on said nozzle for establishing circular seals with inner edges of said offset flanges, a main piston slidable in the cylinder and having a circular series of secondary pistons adapted to enter some of the openings in the closed end of the cylinder and having openings registering with the other of said openings in the closed end of the cylinder, means for admitting an adhesive into the cylinder for flow through the openings in the main piston and around the secondary pistons for filling the openings in the closed end of the cylinder when the main piston is in a retractive position relatively to the cylinder, means yieldingly retaining the cylinder in projected position relatively to the main piston, and means for moving the cylinder and main piston toward the washer to bring said shoulders of the nozzle into contact with the said edges of the flanges of the washer and for moving the piston in said cylinder to project the secondary pistons into their related openings in the closed end of the cylinder to force adhesive through said orifices into contact with the inner flange of the washer and to return excess adhesive through the orifices registering with the other of said openings for passage through the openings in said piston to the low pressure side of said piston.

11. An apparatus for securing resilient gasket rings to washers, including a support having a horizontal top provided with a discharge opening, a turntable having a circular series of openings, means for rotatably mounting the turntable on said top for bringing the openings in the turntable consecutively over the discharge opening, means for feeding washers into the openings of the turntable, a crosshead reciprocably supported above said top, a main piston having a shank depending from the crosshead in laterally offset relation with respect to the discharge opening to register with one of the openings in the turntable which contains a washer, a cylinder slidable over the main piston and having a closed end provided with an opening

17 for passing said shank, a spring between the crosshead and cylinder for yieldingly urging the cylinder in projected position with respect to the main piston, said other end of the cylinder being provided with a circular series of spaced apart openings, a nozzle fixed to the said other end of the cylinder and having a corresponding series of smaller orifices in connection with said openings, said nozzle having concentric annular faces for establishing circular seals with the washers on the respective inner and outer sides of the series of orifices in the nozzle, a circular series of secondary pistons on the main piston adapted to enter some of said openings of the series of openings in said cylinder, said main piston having openings therethrough in registry with the other of said openings of the circular series of openings, means for admitting an adhesive into the cylinder for flow through the openings in the main piston and around the secondary pistons for filling the circular series of openings in said cylinder, a tubular plunger, means yieldingly supporting the tubular plunger from the crosshead in registry with the discharge opening, a drying wheel rotatable under said top and having radial pins adapted to be successively registered with the discharge opening, means for feeding gasket rings under the tubular plunger and onto a washer contained in the opening of the turntable that is registering with the discharge opening, and means for reciprocating the crosshead to bring the said nozzle into contact with the washer registering with the nozzle for applying adhesive to the washer and for moving the tubular plunger to press a gasket ring into contact with the adhesive on a washer registering with the discharge opening and to project the washer with the gasket ring onto a pin of the drying wheel then registering with the discharge opening.

12. An apparatus for securing resilient gasket rings to washers, including a support having a horizontal top provided with a discharge opening, a turntable having a circular series of openings, means for rotatably mounting the turntable on said top for bringing the openings in the turntable consecutively over the discharge opening, means for feeding the washers into the openings of the turntable, means for applying adhesive to the washers in one position of the turntable, a crosshead reciprocably supported above said top and over the discharge opening, a tubular guide depending from the crosshead in registry with the discharge opening, a sleeve slidable in the tubular guide and having a head engaging an internal shoulder of the tubular guide, a spring in the tubular guide yieldingly retaining said head in engagement with the shoulder, a tubular plunger slidable in the sleeve and having a head engaging an internal shoulder in the sleeve, a stem on the head of the plunger and adapted to be engaged by the head of the sleeve, a spring between said heads for normally retaining the head of the plunger against said internal shoulder of the sleeve, a drying wheel rotatable under said top and having radial pins adapted to be successively registered with the discharge opening, means for feeding gasket rings under the tubular plunger and onto the washer in the openings of the turntable as they are registered with the discharge opening, and means for reciprocating the crosshead to press the gasket ring into contact with the adhesive on the washer and to project the washer with the gasket ring thereon onto a pin of the drying wheel.

13. An apparatus for securing resilient gasket rings to washers to provide single units, said apparatus including the combination of means for applying an adhesive to the washers, means for carrying the washers in successive order to the adhesive applying means and advancing the washers from the adhesive applying means with the adhesive thereon, means for depositing a resilient gasket ring onto each washer to make contact with the adhesive, conveying means having pins thereon of slightly larger diameter than the inner diameter of the gasket rings for carrying the washers with the gasket rings thereon in gripping engagement with the pins to hold pressure contact of the gasket rings with the washers during carriage thereof by the conveying means through a drying zone, and means for transferring the washers with the gasket rings thereon from said carrying means to the conveying means.

14. In an apparatus of the character described, a support having a discharge opening, adhesive applying means for applying adhesive to the washers, means for conveying washers through the adhesive applying means and over the discharge opening, means for feeding washers into said conveying means, means for advancing the conveying means by steps, a gasket ring support extending over the turntable and having an opening in registry with the discharge opening, means associated with the opening in said gasket support for gripping and holding the washers that are carried by the conveying means from dropping through the discharge opening, means for feeding gasket rings across the gasket ring support for deposit upon the washer held by said gripping means, and a plunger reciprocable into contact with the gasket ring of the gripped washer to press the gasket ring into contact with the washer and to free the washer from the gripping means for discharge from the conveying means through the discharge opening.

15. In an apparatus of the character described, a support having a discharge opening, adhesive applying means for applying adhesive to the washers, means for conveying washers through the adhesive applying means and over the discharge opening, means for feeding washers into conveying means, means for advancing thee conveying means by steps, a gasket ring support extending over the turntable and having an opening in registry with the discharge opening, means associated with the opening in said gasket support for gripping and holding the washers that are carried by the conveying means from dropping through the discharge opening, means for feeding gasket rings across the gasket ring support for deposit upon the washer held by said gripping means, a plunger reciprocable into contact with the gasket ring of the gripped washer to press the gasket ring into contact with the washer and to free the washer from the gripping means for discharge from the conveying means through the discharge opening, and means movable across the discharge opening to carry the washers with the gasket rings thereon through a drying zone.

16. In an apparatus of the character described, a support having a top provided with a discharge opening, a turntable having a circular series of openings, means for rotatably mounting the turntable on said top for bringing the openings in the turntable consecutively over the discharge opening, means for feeding washers into said openings of the turntable, means for advancing the turntable by steps, means for applying adhesive to the washers, a gasket ring support extending over the turntable and having an opening in registry with the discharge opening, means associated with the opening in said gasket support for gripping and holding the washers from dropping through the discharge opening, means for feeding gasket rings across the gasket ring support for deposit upon the washer held by said gripping means, and a plunger reciprocable into contact with the gasket ring of the gripped washer to press the gasket ring into contact with the washer and to free the washer from the gripping means for discharge through the discharge opening of said top.

17. In an apparatus of the character described, a support having a top provided with a discharge opening, a turntable having a circular series of openings, means for rotatably mounting the turntable on said top for bringing the openings in the turntable consecutively over the discharge opening, means for feeding washers into said openings of the turntable, means for advancing the turntable by steps, means for applying adhesive to the washers, a gasket ring support extending over the turntable and having an opening in registry with the discharge opening, magnetic means associated with the opening in said gasket support for gripping and holding the washers from dropping through the discharge opening, means for feeding gasket rings across the gasket ring support for deposit upon the washer held by said gripping means, and a plunger reciprocable into contact with the gasket ring of the gripped washer to press the gasket ring into contact with the washer and to free the washer from the magnetic means for discharge through the discharge opening of said top.

18. In an apparatus of the character described, a support having a top provided with a discharge opening, a turntable having a circular series of openings, means for rotatably mounting the turntable on said top for bringing the openings in the turntable consecutively over the discharge opening, means for feeding washers into said openings of the turntable, means for advancing the turntable by steps, means for applying adhesive to the washers, a gasket ring support extending over the turntable and having an opening in registry with the discharge opening, magnetic means associated with the opening in said gasket support for gripping and holding the washers from dropping through the discharge opening, means for feeding gasket rings across the gasket ring support for deposit upon the washer held by said gripping means, a plunger reciprocable into contact with the gasket ring of the gripped washer to press the gasket ring into contact with the washer and to free the washer from the magnetic means for discharge through the discharge opening of said top, and means across the discharge opening to carry the washers with the gasket rings thereon through a drying zone, said last named means including means for retaining the gasket rings in pressing contact with the washers during drying of the adhesive.

19. In an apparatus for applying adhesive to washers of a type having offset inner and outer flange portions to provide a recess for a gasket ring, an adhesive applicator, means for carrying the washers with the recess side uppermost to the adhesive applicator, a tubular guide having vertical support over the carrying means, a floating pin in the tubular guide for supporting the washers in a stack and having a tapered upper end projecting from the tubular guide for guiding the washers into the stack, means for feeding the washers recess-side down, means intermediate the feeding means and the tapered end of the pin for inverting the washers and dropping the washers onto the pin with the recess-side uppermost, and means for removing the washers from the bottom of the stack into said carrying means.

20. In an apparatus for applying adhesive to washers of a type having offset inner and outer flange portions to provide a recess for a gasket ring, an adhesive applicator, means for carrying the washers with the recess side uppermost to the adhesive applicator, a tubular guide having vertical support over the carrying means, a pin in the tubular guide for supporting the washers in a stack and having a tapered upper end projecting from the tubular guide for guiding the washers into the stack, means for feeding the washers recess-side down, means intermediate the feeding means and the tapered end of the pin for inverting the washers and dropping the washers onto the pin, means controlled by the height of the stack to stop feed of the washers to the washer inverting means, and means for removing the washers from the bottom of the stack into said carrying means.

21. In an apparatus for applying adhesive to a member for attaching an element thereto, a support for said member, an adhesive applicator including a cylinder, a piston reciprocable within the cylinder, said cylinder having ports and the piston having openings therethrough, piston elements on said piston and movable from and into other of said ports, means for supplying an adhesive to the cylinder on a low pressure side of the piston, a nozzle carried by the cylinder and having orifices in connection with the ports of the cylinder and having annular means for providing sealing contact with said member and encircling an open side passageway in connection with said orifices, means for differentially actuating the piston and cylinder for moving the nozzle into contact with said member and the piston in the cylinder for projecting the piston elements into ports for discharging adhesive therein through the orifices of the nozzle into the passageway and for return of surplus adhesive from said passageway through said openings of the piston, said actuating means being operable to first retract the piston in the cylinder to withdraw the piston elements from said ports for refilling the ports with adhesive and then the cylinder for withdrawing the nozzle from sealing contact with said member to leave a deposit of adhesive thereon.

22. In an apparatus for applying adhesive to a member for attaching an element thereto, a support for said member, an adhesive applicator including a cylinder, a piston reciprocable within the cylinder, said cylinder having ports and the piston having openings therethrough, piston elements on said piston and movable from and into other of said ports, means for supplying adhesive to the cylinder on a low pressure side of the piston, a nozzle carried by the cylinder and having orifices in connection with the ports of the cylinder and having annular means for providing sealing contact with said member and encircling an open side passageway in connection with said orifices, a reciprocatory actuator connected with the piston, and a resilient connection between the actuator and the cylinder for moving the nozzle into contact with said member and yieldable responsive to further movement of the actuator to move the piston in the cylinder for projecting the piston elements into ports for discharging adhesive therein through the orifices of the nozzle into the passageway and for return of surplus adhesive from said passageway through said openings of the piston, said piston being first retractable in the cylinder to withdraw the piston elements from said ports for refilling the ports with adhesive and followed by the cylinder for withdrawing the nozzle from sealing contact with said member to leave a deposit of adhesive thereon.

23. In an apparatus for applying a substantially continuous ring of adhesive to a member for attaching a circular element thereto, a support for said member, an adhesive applicator including a cylinder, a piston reciprocable within the cylinder, said cylinder having a circular series of ports and the piston having openings in registry with some of said ports, piston elements on said piston and movable from and into the other of said ports, means for supplying an adhesive to the cylinder on a low pressure side of the piston, a nozzle carried by the cylinder and having orifices in connection with the ports of the cylinder and having concentric annular shoulders for providing inner and outer sealing contacts with said member and an open faced annular passageway therebetween in connection with said orifices, means for differentially actuating the piston and cylinder for moving the nozzle into contact with said member and the piston in the cylinder for projecting the piston elements into certain of the cylinder ports for discharging adhesive therein through the orifices of the nozzle and for return of surplus adhesive from said passageway through other of the orifices in the nozzle, and cylinder ports to the low pressure side of the piston through said openings, said actuating means being operable to first retract the piston in the cylinder to withdraw the piston elements from said ports for refilling the ports with adhesive and then the cylinder for withdrawing the nozzle from sealing contact with said member to leave a circular deposit of adhesive thereon.

24. In an apparatus for applying a substantially continuous ring of adhesive to a member for attaching a circular element thereto, a support for said member, an adhesive applicator including a cylinder, a piston reciprocable within the cylinder, said cylinder having a circular series of ports and the piston having openings in registry with some of said ports, piston elements on said piston and movable from and into the other of said ports, means for supplying an adhesive to the cylinder on a low pressure side of the piston, a nozzle carried by the cylinder and having orifices in connection with the ports of the cylinder and having concentric annular shoulders for providing inner and outer sealing contacts with said members and an open faced annular passageway therebetween in connection with said orifices, a reciprocatory actuator connected with the piston, a resilient connection between the actuator and the cylinder for moving the nozzle into contact with said member and yieldably responsive to further movement of the actuator to move the piston in the cylinder for projecting the piston elements into certain of the cylinder ports for discharging adhesive therein through the orifices of the nozzle and for return of surplus adhesive from said passageway through other of the orifices in the nozzle, and cylinder ports to the low pressure side of the piston through said openings, said piston being first retractable in the cylinder to withdraw the piston elements from said ports for refilling the ports with adhesive and followed by the cylinder for withdrawing the nozzle from sealing contact with said member to leave a circular deposit of adhesive thereon.

25. An apparatus for securing a gasket ring to a washer having an opening encircled by an annular recess to accommodate the gasket ring therein coaxially of the opening, said apparatus including a nozzle having inner and outer concentric annular portions for seating contact with inner and outer annular portions of said recess to provide an annular passageway between said seating contacts and encircling the opening of said washer, means for bringing the washer and said nozzle into and out of said seating contact, means for flowing an adhesive under pressure into said passageway when the washer and nozzle are in said seating contact to provide a substantially annular deposit of adhesive in said recess when the nozzle and washer are out of contact, means for depositing the gasket ring into the recess of the washer for contact with the adhesive, and means for holding pressure of the gasket ring on the washer during set of the adhesive.

26. An apparatus for securing a gasket ring to a washer having an opening encircled by an annular recess to accommodate the gasket ring therein coaxially of the opening as described in claim 25, and including means for applying heat to hasten set of the adhesive.

References Cited in the file of this patent

UNITED STATES PATENTS

| | | |
|---|---|---|
| 867,834 | Neureuther | Oct. 8, 1907 |
| 1,735,609 | Frederick | Nov. 12, 1929 |
| 1,782,989 | Frederick | Nov. 29, 1930 |
| 2,389,902 | Glaude | Nov. 27, 1945 |
| 2,772,903 | Sussenbach | Dec. 4, 1956 |
| 2,778,530 | Sillars | Jan. 22, 1957 |
| 2,834,394 | Sharn et al. | May 13, 1958 |